United States Patent Office 3,173,651
Patented Mar. 16, 1965

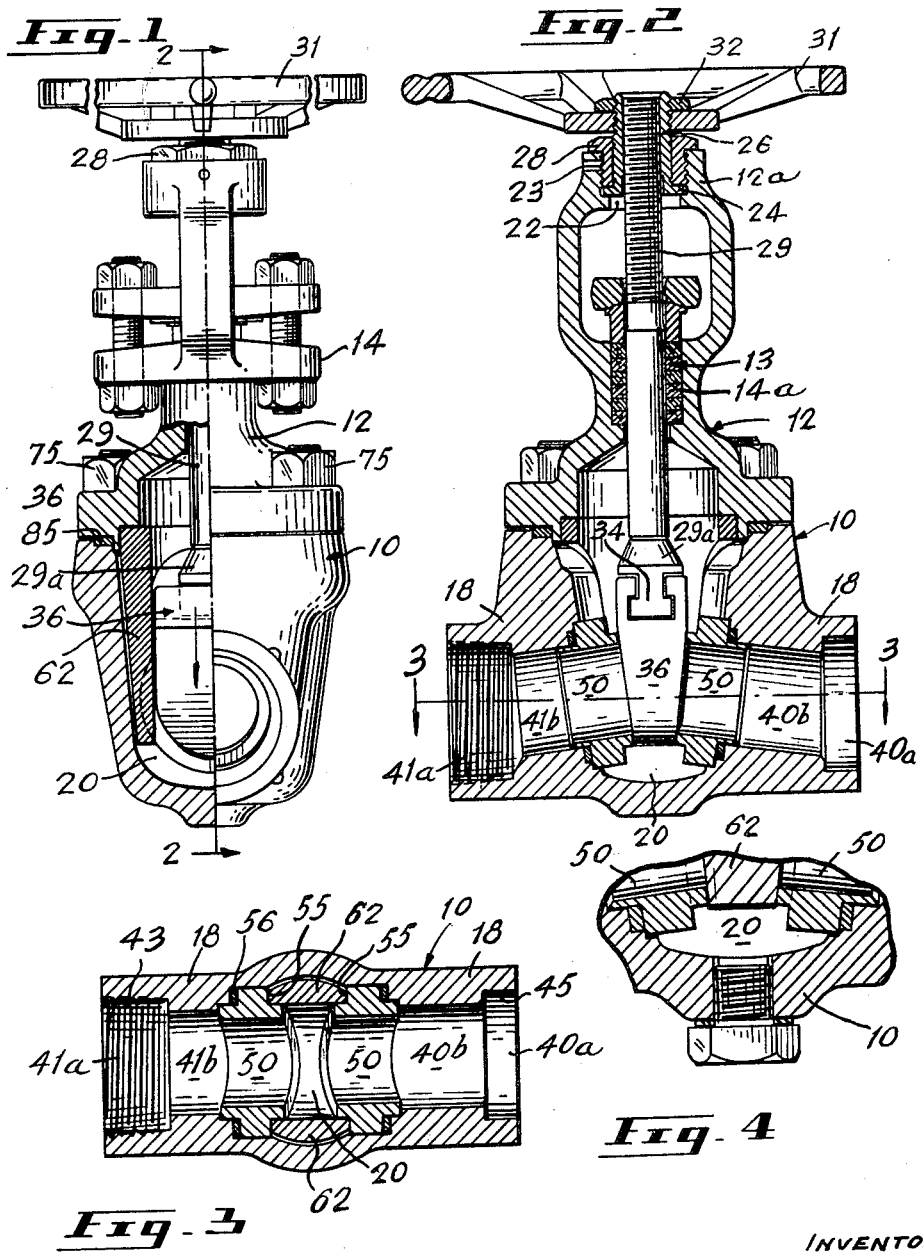

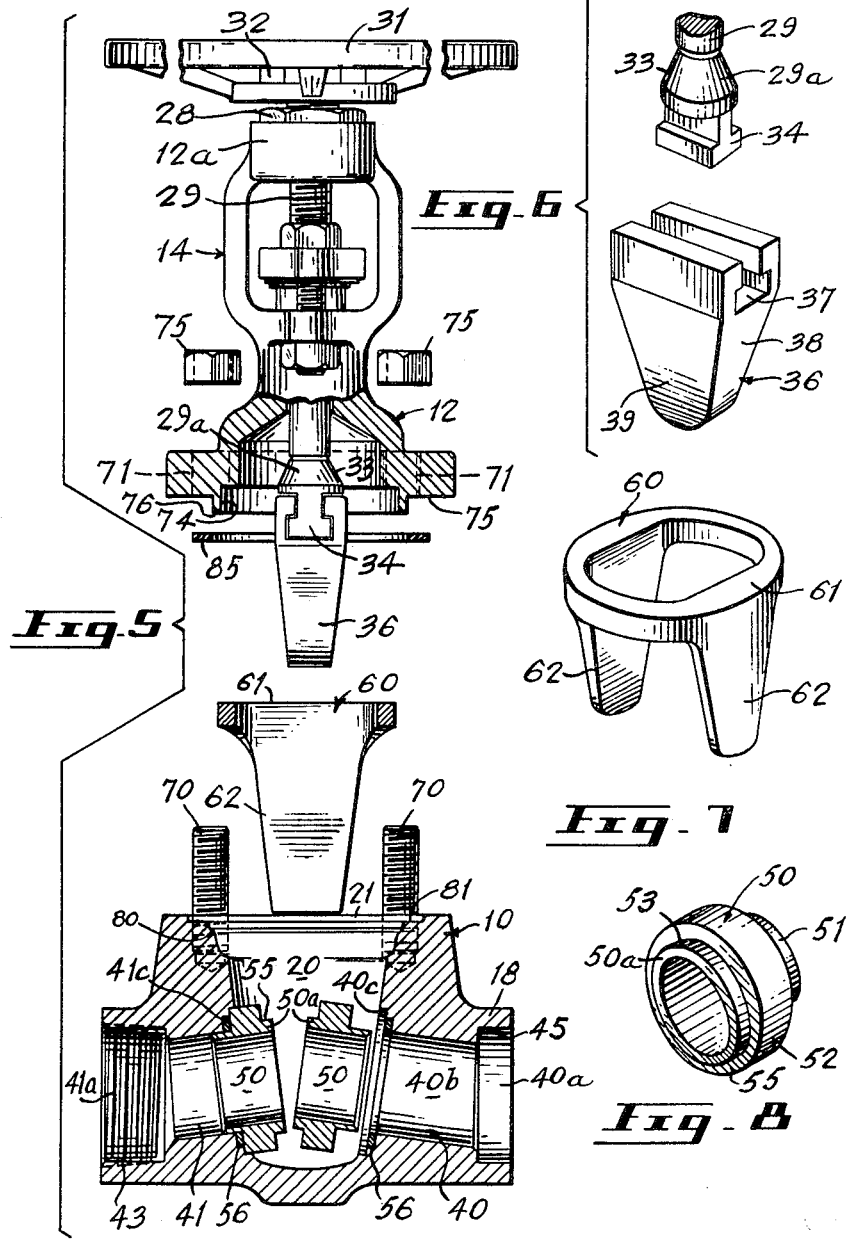

3,173,651
GATE VALVE WITH REMOVABLE SEATS
Adolf Karel Velan, 3772 Grey Ave., Westmount, Quebec, Canada
Filed Jan. 14, 1963, Ser. No. 251,274
4 Claims. (Cl. 251—328)

The present invention relates to improvements in the construction of gate valves and more particularly to a gate valve construction for high pressure service embodying means whereby service and repairs can be accomplished in line service.

At the present time, forged steel gate valves are used in all sizes from ½″ up to 2″ in large quantities in oil refineries, chemical industries and power plants for pressures running up to about 800 p.s.i. In exceptional cases the pressures will run up to about 1500 p.s.i. and even higher. In order to meet the ever increasing requirements for handling such pressures valve manufacturers are providing improved valve designs wherein drop forged bodies are utilized with the operating portions of the valve accordingly being made of stronger materials and close tolerances to withstand the work loads imposed. A further problem which faces a valve manufacturer today is that in view of greater production requirements and so on it is almost a necessity that high pressure valves of the type with which the invention is concerned be designed so that they can be repaired and serviced without the necessity of their being removed from line service.

Various expedients have been proposed to overcome these problems, for example, the applicant's earlier United States Patent 2,905,192 issued September 22, 1959 discloses a gate valve construction which is capable of "in-line" service and there are other known valve constructions which are, in general, satisfactory.

However, there is still room for improvement in the mounting and retention of the valve seats in such valves. In most known constructions, these are of the integral stellited type or when they are of the removable type (for service) as is disclosed in the applicant's United States Patent 2,905,192 previously mentioned, they are usually of the screw-in type. While these latter screw-in seats are satisfactory for many applications they are difficult to remove after some time in service under the high pressure continuous service conditions mentioned above.

The present invention recognizes this problem and aims to provide a satisfactory solution by furnishing an improved gate valve design wherein the valve seats can be easily and quickly serviced or replaced without the necessity of removing the valve from service line operation.

More specifically, the invention comprises a gate valve construction having a main valve body with its axes in a vertical plane and including an internal fluid chamber having an open end. A removable bonnet is mounted on said valve body over the open end and means are provided to retain the bonnet in sealed relationship with the body. An elongated valve stem is mounted in the bonnet with one end portion extending into the valve body chamber for reciprocal movement therein and valve stem actuating means are mounted on the bonnet and engaged with the other end of said valve stem. Opposed fluid inlet and outlet passages are provided in the valve body leading into said fluid chamber and valve seats are located in alignment with the inner ends of each of the fluid inlet and outlet passages to present opposed seating faces disposed obliquely to the axis of the valve stem. A valve gate is removably mounted on the end of the valve stem extending within the chamber with the gate having opposed seating surfaces corresponding with and adapted to seat on the opposed valve seats.

In accordance with the invention, a wedge shaped valve seat retaining member is mounted within the valve body and is adapted to engage and wedgedly retain the valve seats within the inner ends of the fluid inlet and outlet passages with the end of the valve seat retaining member remote from said seat engagement engaged in pressure contact with a lower portion of the bonnet and being otherwise free of contact with the valve body. The valve seats are made as unthreaded cylindrical bushings with a seating face on one end and with the other end having a diameter adapted to snugly fit within corresponding borings provided at the inner ends of the inlet and outlet passages leading into the valve body fluid chamber. With this arrangement removal of the bonnet removes the valve stem and gate and permits ready removal of the valve seat retaining member freeing the valve seats and permitting their removal through the valve body open end. In the preferred construction the valve seat engaging member is of annular formation with the valve seat engaging members made as tapering forks fitting annular grooves provided in the valve seats forcing them into contact with special sealing rings or gaskets placed between each ring and the valve body portions surrounding the inlet and outlet passages. Due to the tapering formation of the seat retaining member forks the compression of the seat gaskets are controlled by the vertical movement or pressure of the fork created by its pressure contact with the bonnet.

Having thus generally described the nature of the invention, particular reference will be made to the accompanying drawings, showing by way of illustration a preferred embodiment thereof, and in which;

FIGURE 1 is a view in side elevation, partially in section, of a gate valve construction embodying a removable valve seat retaining assembly in accordance with the invention;

FIGURE 2 is a cross sectional view of the construction of FIGURE 1 in section along the line 2—2 of FIGURE 1;

FIGURE 3 is a cross sectional view of the construction of FIGURE 1 as shown along the line 3—3 of FIGURE 2;

FIGURE 4 is a partial cross sectional view corresponding to the lower portion of FIGURE 3 showing an alternative construction of a valve body embodying a drain plug;

FIGURE 5 is an exploded view partially in section of the valve construction shown in FIGURE 1 with the bonnet assembly removed to show the easy removal of seat retaining member and valve seats;

FIGURE 6 is an exploded view of the end of the valve stem and valve gate showing their means of interconnection.

FIGURE 7 is a detail view in perspective elevation of the seat retaining member of the invention.

FIGURE 8 is a detail view in perspective elevation of a removable valve seat utilized with the seat retaining member of the invention.

With particular reference to FIGURES 1, 2 and 5 of the drawings showing a gate valve construction embodying the valve seat retaining means of the invention, this construction includes a main valve body 10 (preferably a solid drop forging) having aligned transverse extensions 18 with the interior of the body recessed axially to provide a fluid chamber 20 having an open top 21. The top 21 of the valve body chamber 20 is sealed by a sealing bonnet 12 (also preferably a drop forging) which includes a stuffing box 13 and an improved yoke design permitting easy access to a two piece gland assembly 14.

The top portion 12a of the bonnet 12 is provided with an axial recess 22 adapted to slidably accommodate the flange 24 of a rotary sleeve 26. The flange 24 of the sleeve 26 is retained for free rotation by a flanged retaining nut 28 threadably engaged with the correspondingly tapped upper portion 23 of the recess 22. The interior bore of the sleeve 26 is threaded so as to threadably receive and engage the correspondingly threaded end of an elongated valve stem 29 which extends through the bonnet 12 into the valve body fluid chamber 20.

The valve stem 29 slidably fits through and is aligned axially by the gland assembly 14 containing a plurality of packing rings 14a, preferably high quality asbestos. As shown, the valve stem 29 is provided with a positive back seat 29a which positively isolates the packing from line pressure when the valve is in full open position, adding considerably to packing life.

In order to provide a means whereby the sleeve 26 can be rotated to actuate the valve stem 29 a valve handle 31 is mounted on the upper end of the sleeve 26 and is retained in position by a lock nut 32. With this arrangement, rotation of the sleeve 26 through the handle 31 acts to move the valve stem 29 axially upwards and rotation in the opposite direction moves the valve stem 29 downwards. The valve stem 29 is prevented from rotary movement during its reciprocal movement by the engagement of a valve gate 36 mounted on the lower end of the valve stem and the opposed valve seats located within the valve body as will be described.

As shown most clearly in FIGURE 6, the lower end of the valve stem 29 is shaped to provide a conical flange 33 and a substantially inverted T-shaped key portion 34. The valve gate 36 is provided with a corresponding T-shaped slot 37 so that by sliding engagement of the key 34 within the gate slot 37 the gate is connected to the lower end of the valve stem 29. The body of the valve gate 36 is of generally tapering rectangular outline with opposed tapering side surfaces 38 and flat tapering valve seat engaging surfaces 39.

In accordance with the invention, the transverse extensions 18 are bored to provide inlet 40 and outlet 41 fluid passages. The first portions 40a and 41a are bored in axial alignment with each other and the body of the valve may be tapped as indicated at 43 or alternatively can be made smooth for a welded joint as indicated at 45 to provide a means of connection to suitable conduits. The further portions 40b and 41b are bored as being of lesser diameter than the connecting portions and extend diagonally upwards in opposed relationship to terminate in further enlarged valve seat accommodating portions 40c, 41c which lead into the valve body chamber 20, see FIGURE 5.

Each of the valve seat bushings 50 are provided with a suitable ground face or seating surface 50a adapted to meet one of the seat engaging surfaces 39 of the valve gate 36 and each is provided with a first annular reduction 51 adapted to fit snugly within the portions 40b, 41b of the inlet and outlet passages, a central portion of maximum diameter 52 adapted to fit snugly within the passage end portions 40c, 41c and a second annular reduction 53 adapted to accommodate the legs of the seat retaining member of the invention.

As shown in detail in FIGURE 7 the valve seat retaining member of the invention consists of a bifurcate member 60 having an annular top portion 61 and opposed tapering seat engaging legs 62. This is installed within the valve body chamber 20 as shown with the tapered legs 62 bearing against the outstanding shoulders 55 provided between the valve seat portions 52 and 53, see FIGURE 1.

With particular reference to FIGURE 5, the desired seal between the valve seat bushings or rings 50 and the inlet and outlet passage seat accommodating portions is accomplished by annular seat gaskets 56. Preferably these gaskets 56 are spiral wound stainless steel with asbestos with a compression factor of about .025 for a 1/8" gasket. As will be obvious by reference to the drawings and preceding description the compression of these seat gaskets will be controlled by the vertical movement of the seat retaining member 60 which in turn will be determined by the vertical movement of the bonnet 22.

As shown most clearly in FIGURE 5, the bonnet 12 is removably mounted on the valve body 10 by four (4) threaded studs 70 mounted in the body 10 and passing through corresponding openings 71 provided in the bonnet. Four (4) nuts 75 are utilized to draw the bonnet 12 down into the desired sealing relationship with the valve body 10. The lower surface of the bonnet 12 is provided with an inner annular recess 74 which receives the annular top portion 61 of the seat retaining member 60 and an outer annular recess 75 providing therebetween an annular extended portion 76. The valve body 10 is provided with first and second annular recesses 80, 81 surrounding the open top 21. The annular recess 80 receives the extended portion 76 of the bonnet 12 while the recess 81 receives a sealing gasket 85 preferably of similar construction to the valve seat gaskets 56.

It will be apparent from the preceding description and accompanying drawings that the desired vertical movement of the seat retaining member 60 will be the same as the vertical movement of the body required for correct sealing. As for example, if the seats are disposed at a 7° angle and an 0.025" compression of the valve seat gaskets are required, a vertical movement of $$\frac{0.025''}{\sin 7°}$$

or about 0.205" of the bonnet will be necessary.

Since the valve seat retaining member 60 is engaged and urged in pressure contact with the valve seats 50 only through the bonnet 22, removal of the four (4) locking nuts 75 permits removal of the bonnet and the associated valve stem 29 and valve gate 36. The seat retaining member 60 can then be readily removed through the open top 21 of the valve body releasing the valve seat bushings 50 so that they together with their associated gaskets 56 can be removed for service and/or replacement. All of these functions of course can be accomplished in service line operation and without the use of special tools.

I claim:

1. A gate valve construction comprising a main valve body having its axis in a vertical plane and including an axial recess constituting an internal fluid chamber having an open end, a removable bonnet mounted on said valve body over said fluid chamber open end and means to retain said bonnet in sealed relationship with said valve body, an elongated valve stem mounted in said bonnet for reciprocal movement therein with one end portion extending into said valve body chamber, valve stem actuating means mounted on said bonnet and engaged with the other end of said valve stem, opposed fluid inlet and outlet passages in said valve body leading into said fluid chamber and valve seats having inner and outer seating faces being located in alignment with the inner ends of said fluid inlet and outlet passages to present said outer seating faces in opposed relationship and disposed obliquely to the axis of said valve stem, sealing means beaween the inner seating faces of said valve seats and bordering portions of said valve body surrounding said inlet and outlet openings, a valve gate removably mounted on the said one end of said valve stem extending within said chamber, said valve gate having opposed seating surfaces corresponding with and adapted to seat on said opposed valve seats, a wedge shaped valve seat retaining member mounted within said valve body fluid chamber and having opposed tapering side surfaces extending between and engaging with the said opposed outer surfaces of said valve seats at each side to wedgedly retain said valve seats within the inner ends of said fluid inlet and outlet passages, an end of said valve seat retaining member remote from said seat engagement being engaged in pressure contact with a lower portion of said bonnet and being otherwise free of retaining contact with said valve body, whereby removal of said bonnet removes said valve stem and gate and permits ready removal of said valve seat retaining member releasing said valve seats and permitting removal through said valve body chamber open end.

2. A gate valve construction as claimed in claim 1, wherein said valve seat retaining member is of bifurcate formation having a pair of opposed tapering legs extending downwardly from an annular upper portion, said member legs each having an arcuate outer surface and a flat inner surface with flat side surfaces tapering downwardly from said annular top portion and being adapted to wedgedly engage said valve seats therebetween.

3. A gate valve construction as claimed in claim 1, wherein each of said valve seats comprises an annular bushing having a first portion of reduced diameter adapted to fit snugly within the inner ends of said valve body inlet and outlet passages and a second portion of reduced diameter constituting said valve seating face.

4. A gate valve construction as claimed in claim 1, wherein said means to retain said bonnet in sealed relationship with said valve body includes a plurality of spaced apart threaded studs on said valve body fitting through corresponding openings in the lower portion of said body, a corresponding plurality of nuts threadably engaged with said studs and adapted to draw said bonnet vertically downwards against said body, a compressible spiral wound annular gasket between the lower portion of said bonnet and said body, said sealing means between said valve seats and valve body portion surrounding said inlet and outlet fluid passages also being compressible spiral wound annular gaskets, the pressure applied to said valve seat gaskets through said seat retaining member being directly proportionate to the vertical movement of said bonnet compressing said bonnet gasket depending on the angle at which said seats are positioned relative to the axis of said valve body.

References Cited by the Examiner
UNITED STATES PATENTS

| 161,698 | 4/75 | Meloon | 251—328 |
| 585,684 | 7/97 | Martin | 251—328 |

FOREIGN PATENTS

| 802,266 | 10/58 | Great Britain. |
| 41,008 | 6/37 | Netherlands. |

M. CARY NELSON, *Primary Examiner.*

LAVERNE D. GEIGER, *Examiner.*